March 23, 1954  W. P. GALLAGHER ET AL  2,673,258
AUTOMATIC TIMING MECHANISM
Filed Jan. 26, 1946  8 Sheets-Sheet 1
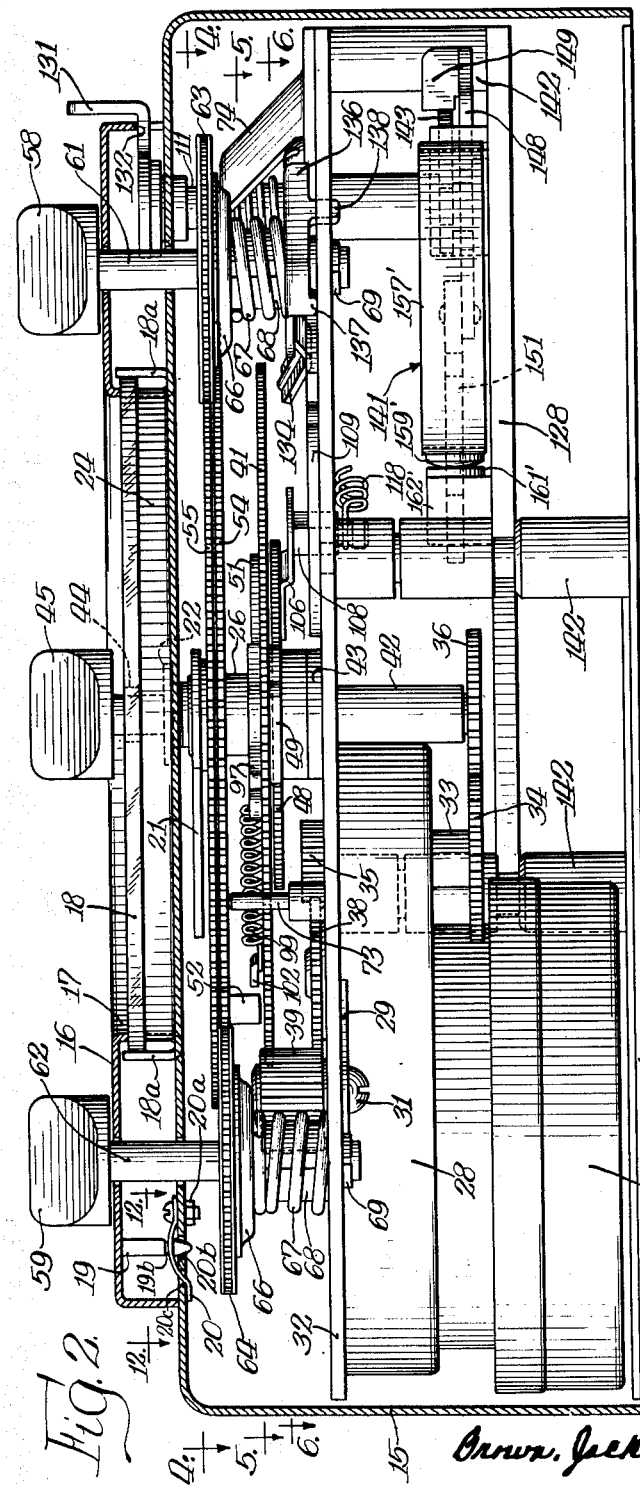
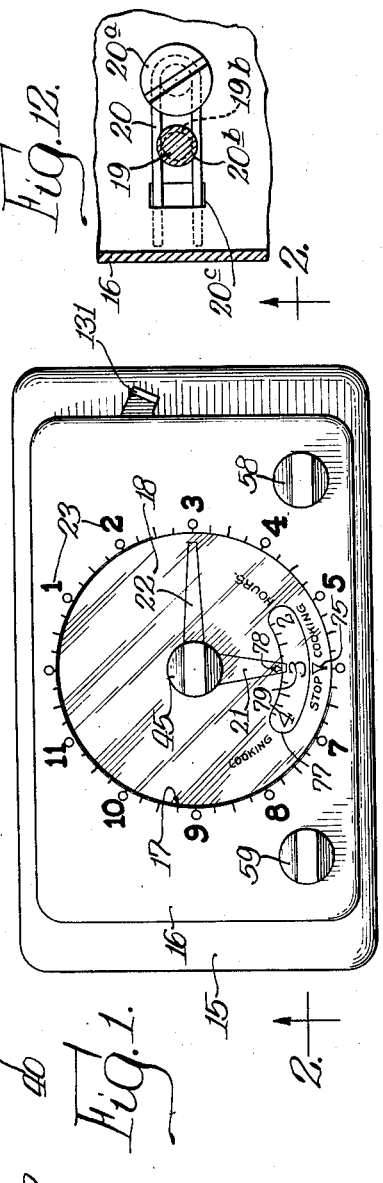
INVENTORS.
William P. Gallagher,
BY Carl Weber, March 23, 1954   W. P. GALLAGHER ET AL   2,673,258
AUTOMATIC TIMING MECHANISM
Filed Jan. 26, 1946   8 Sheets-Sheet 2
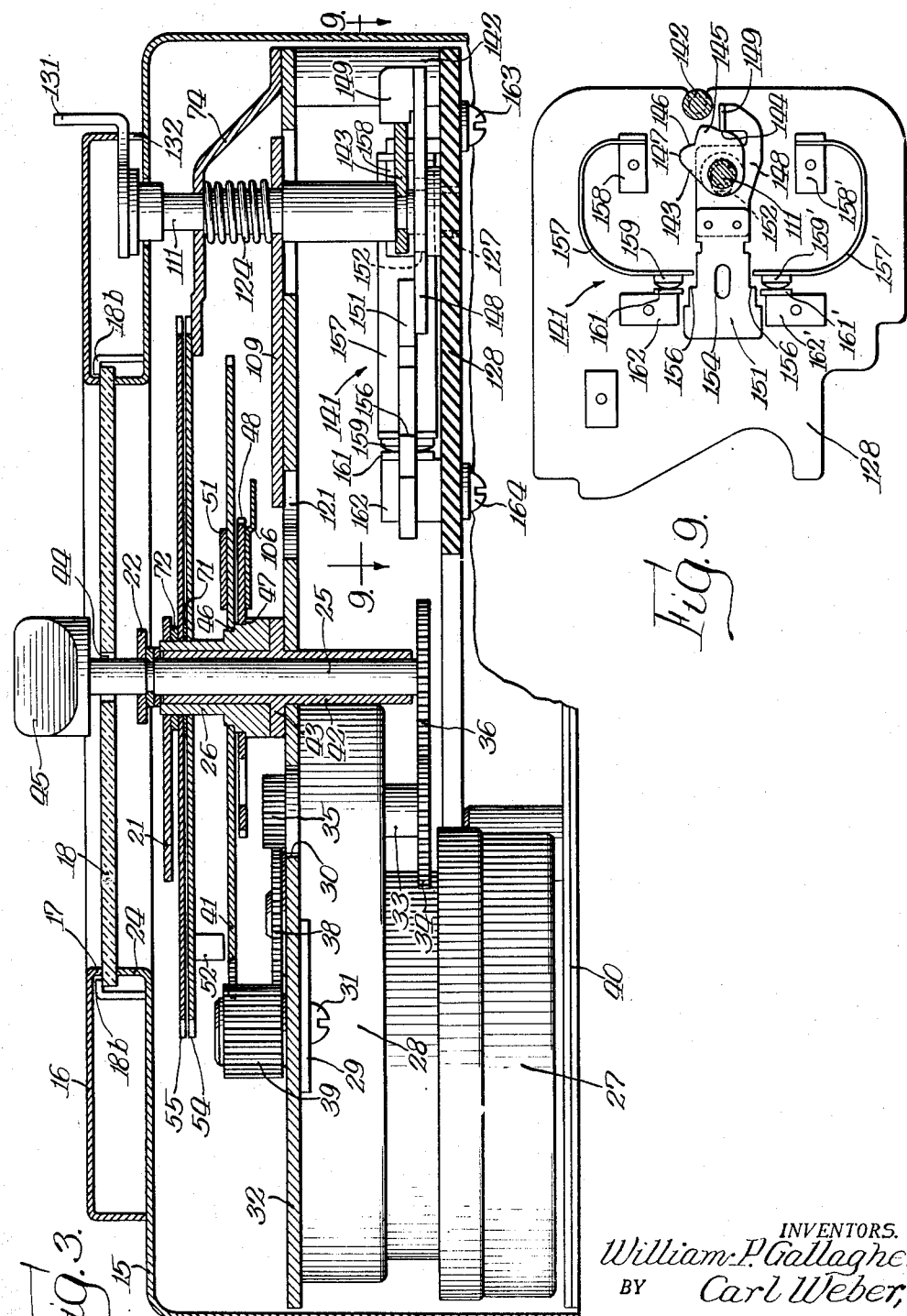
INVENTORS.
William P. Gallagher,
BY Carl Weber, March 23, 1954    W. P. GALLAGHER ET AL    2,673,258
AUTOMATIC TIMING MECHANISM
Filed Jan. 26, 1946    8 Sheets-Sheet 3
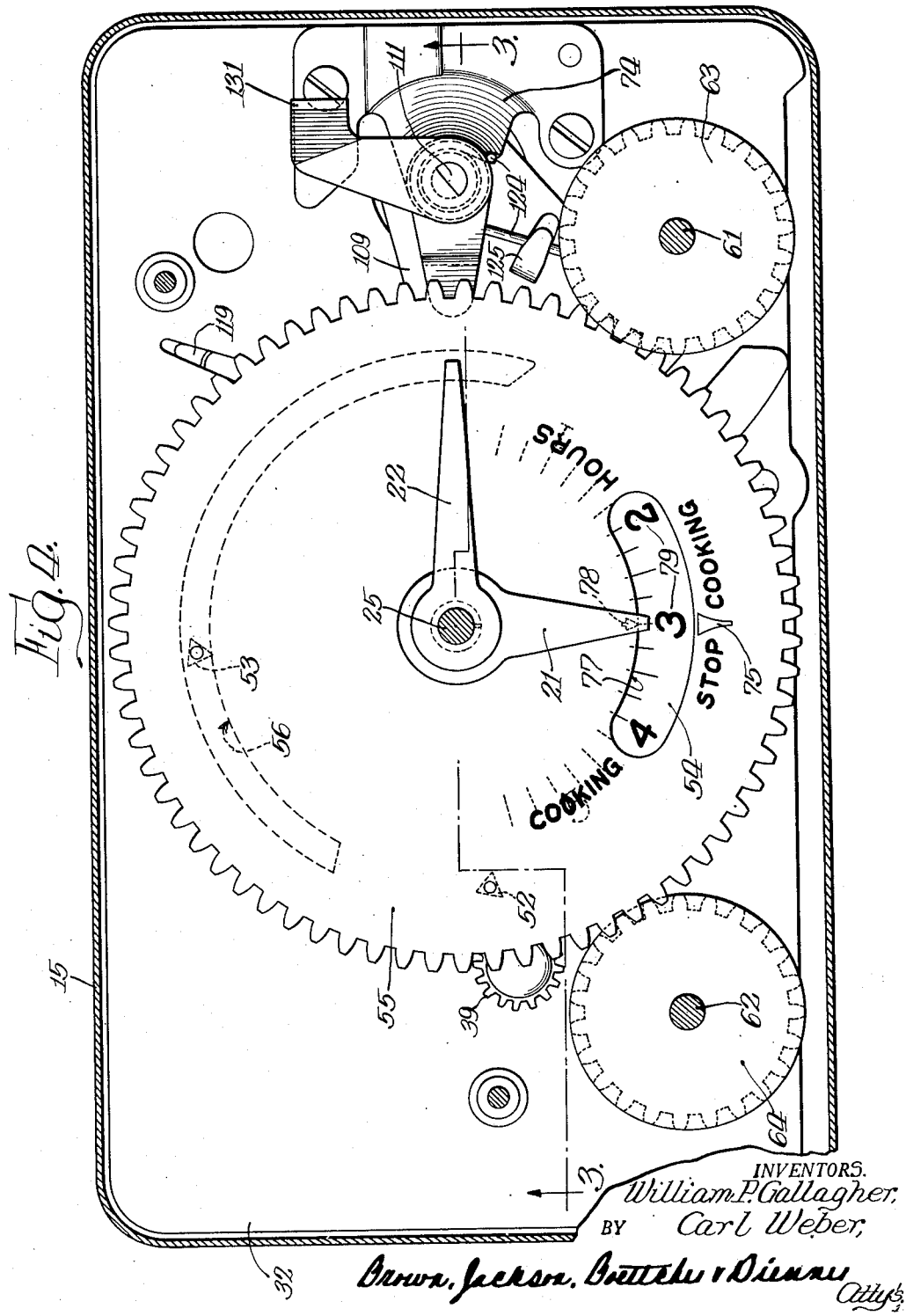
INVENTORS.
William P. Gallagher,
Carl Weber,
BY Brown, Jackson, Boettcher & Dienner
Attys.

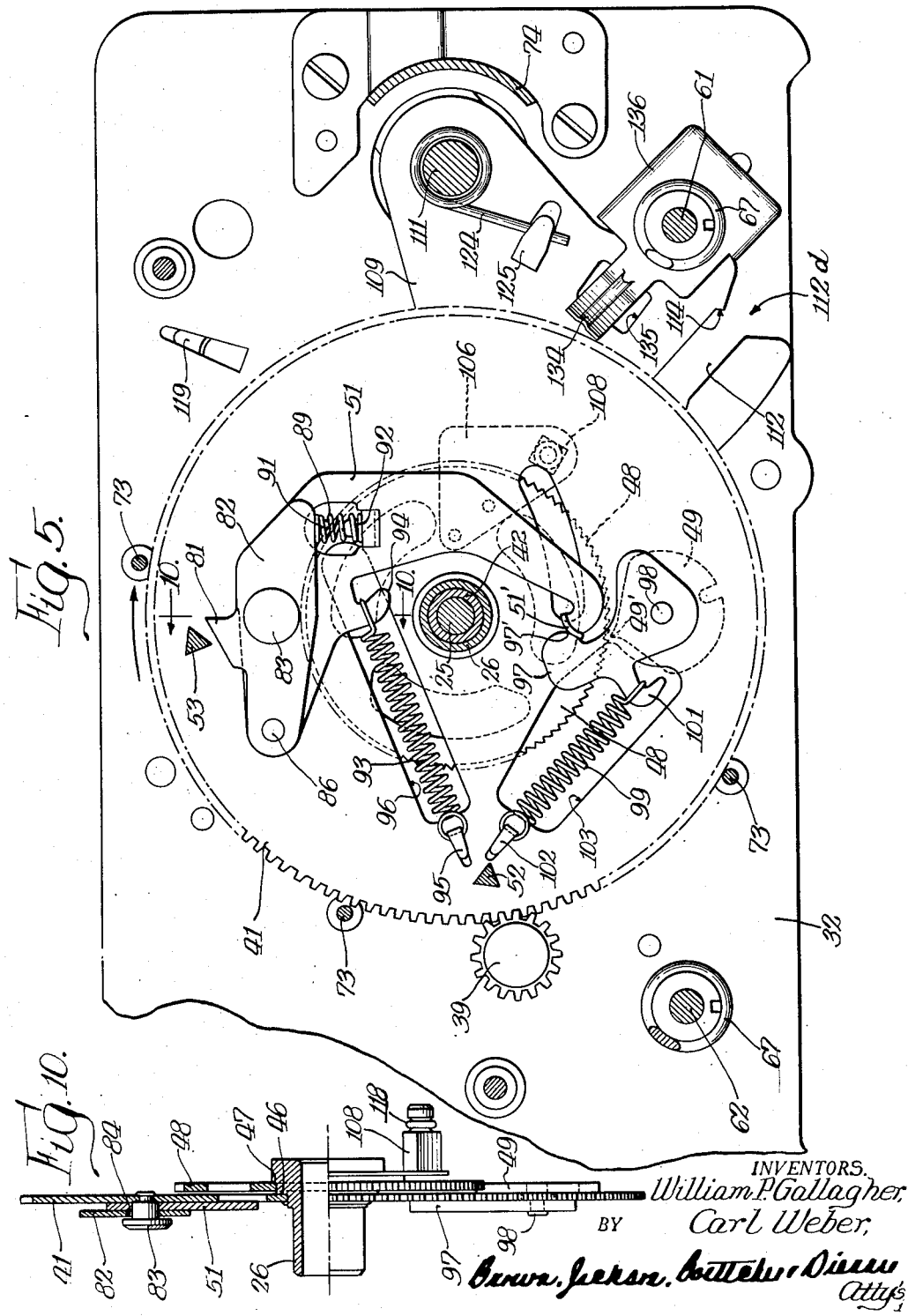

March 23, 1954  W. P. GALLAGHER ET AL  2,673,258
AUTOMATIC TIMING MECHANISM
Filed Jan. 26, 1946  8 Sheets-Sheet 5
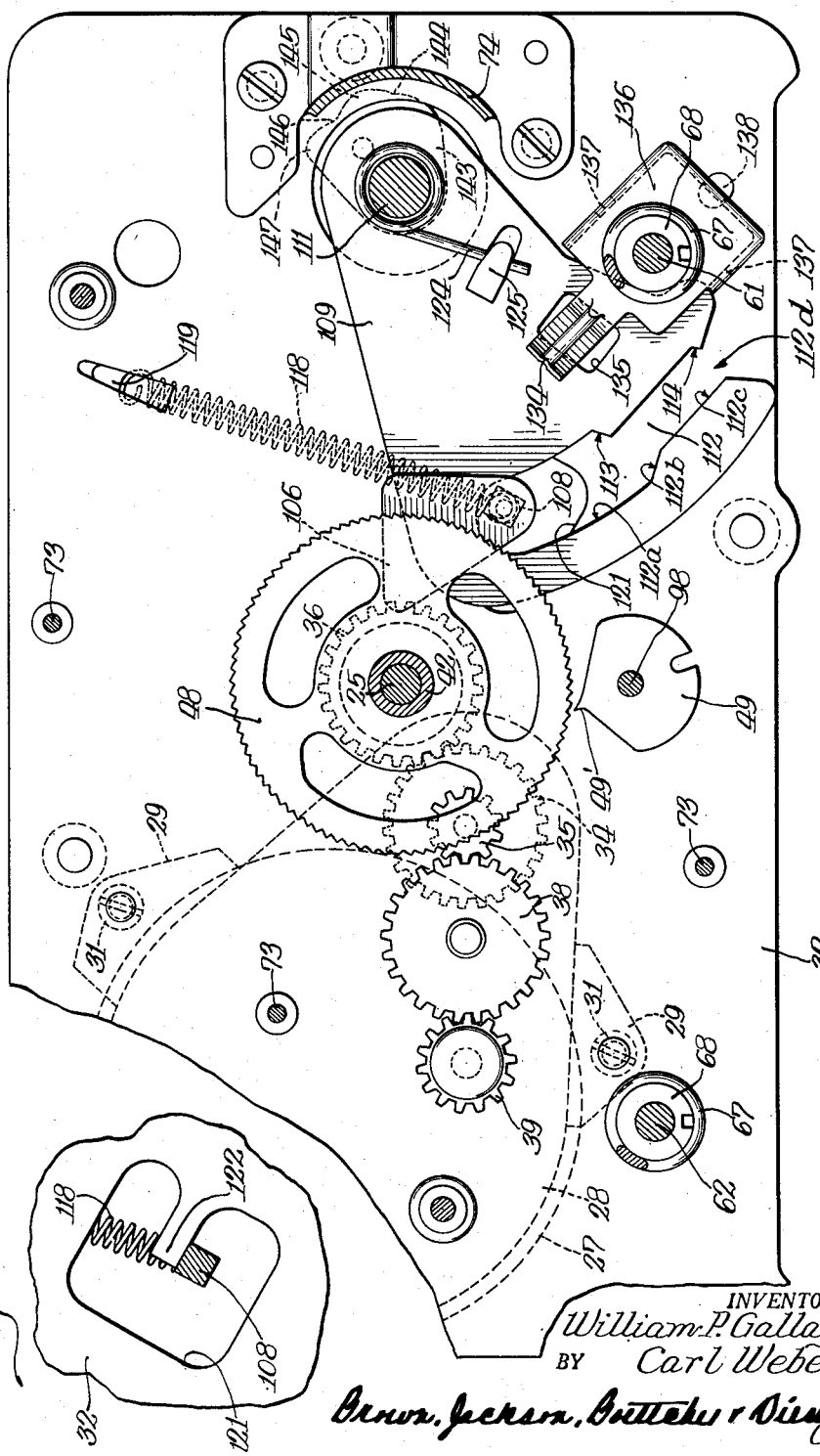
INVENTORS.
William P. Gallagher,
BY Carl Weber,
Brown, Jackson, Boettcher & Dienner
Attys.

March 23, 1954    W. P. GALLAGHER ET AL    2,673,258
AUTOMATIC TIMING MECHANISM
Filed Jan. 26, 1946      8 Sheets-Sheet 6
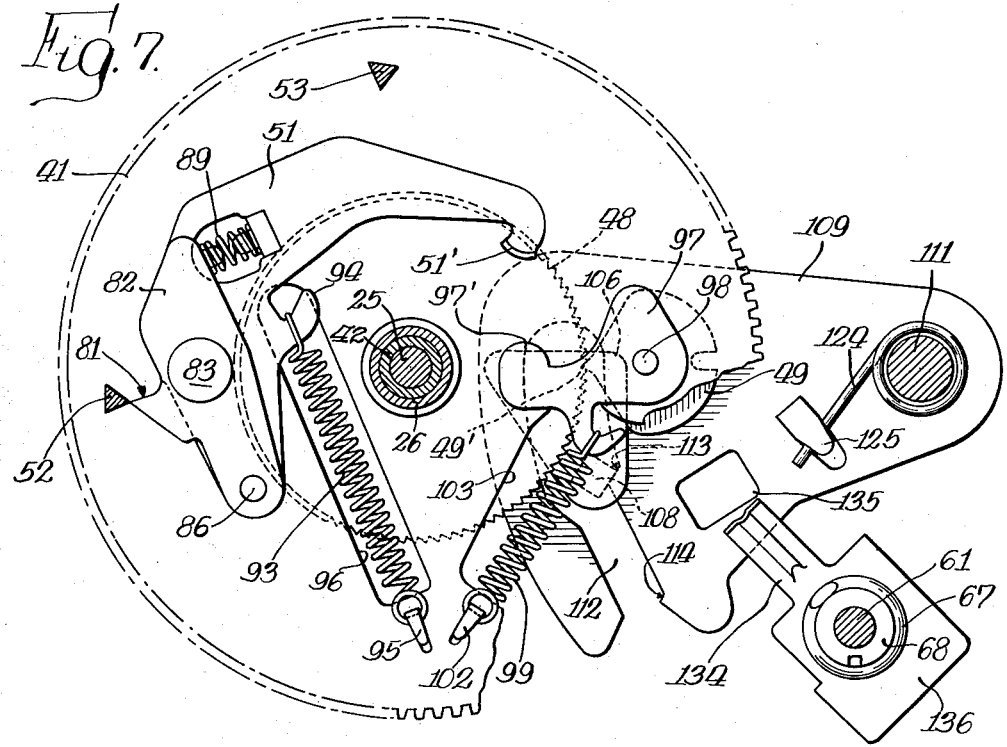
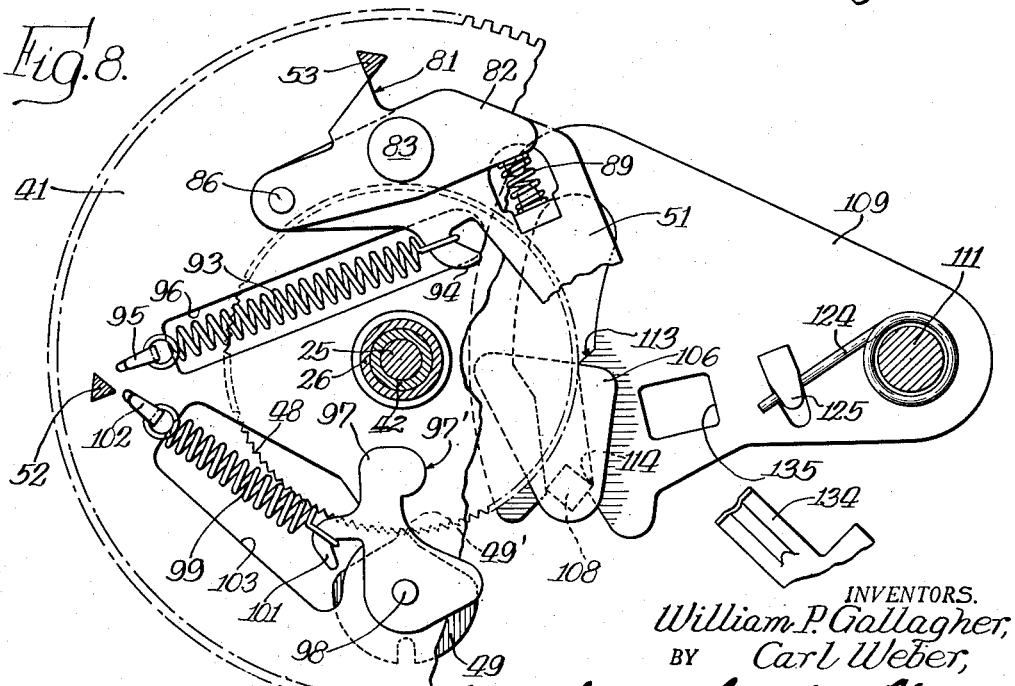
INVENTORS.
William P. Gallagher,
BY Carl Weber,

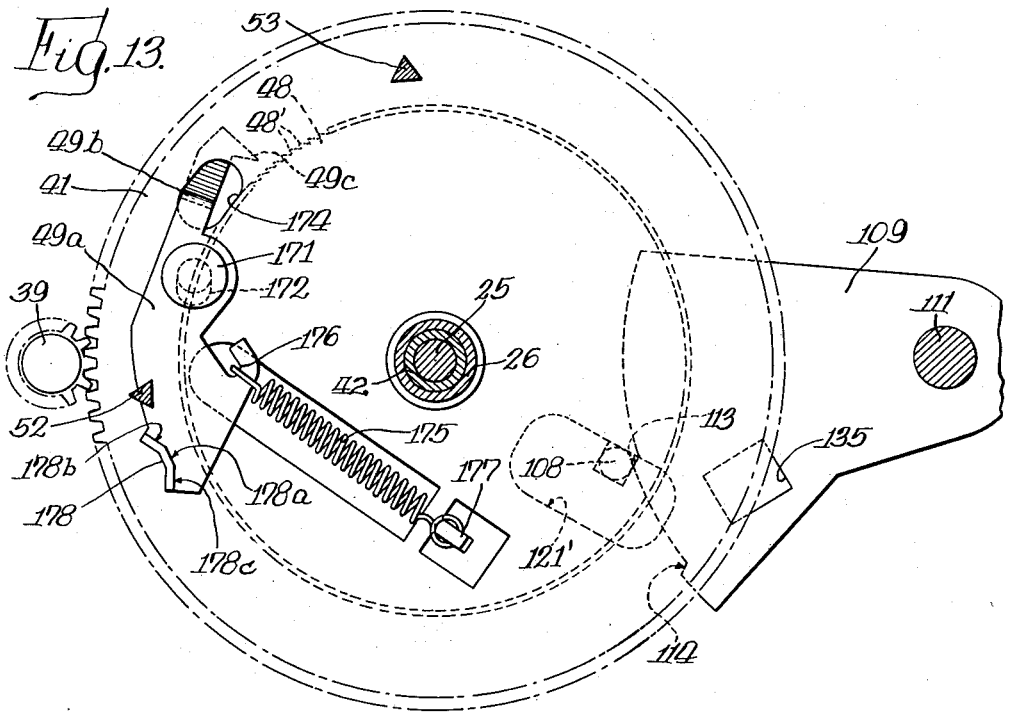
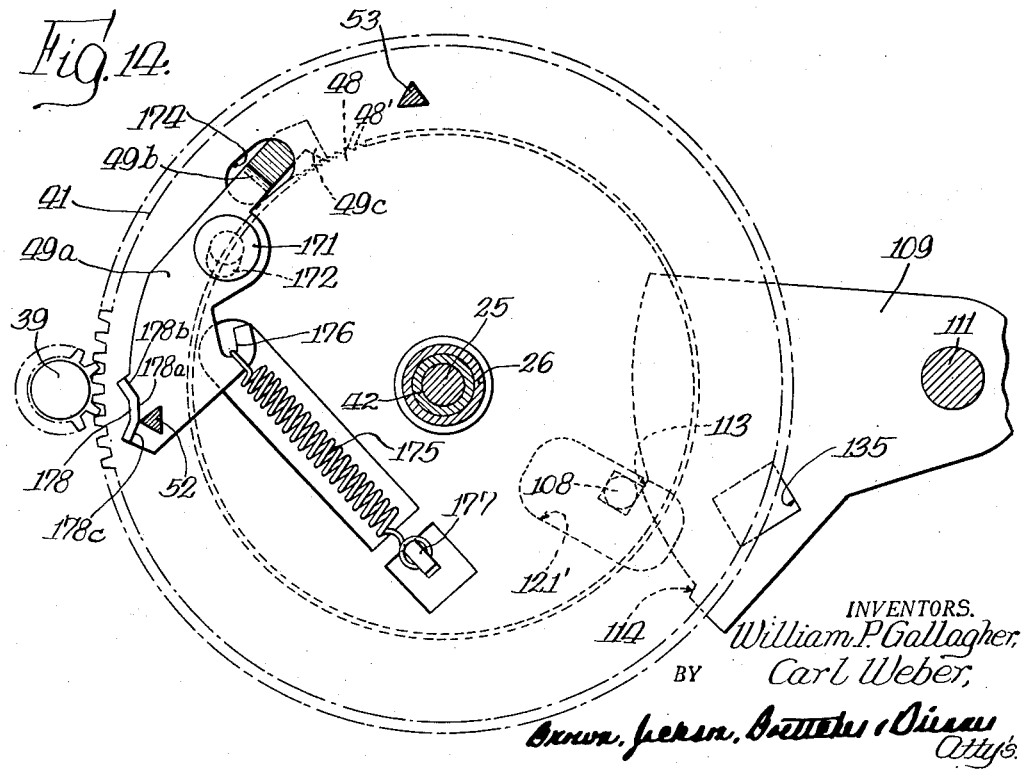

March 23, 1954 W. P. GALLAGHER ET AL 2,673,258
AUTOMATIC TIMING MECHANISM
Filed Jan. 26, 1946 8 Sheets-Sheet 8
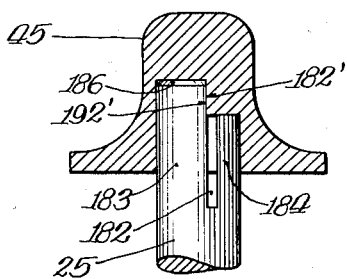
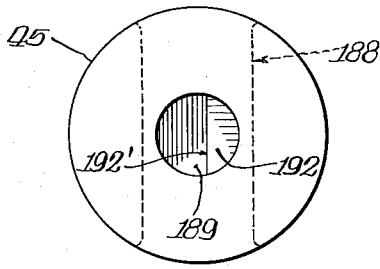
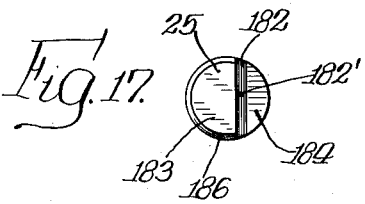
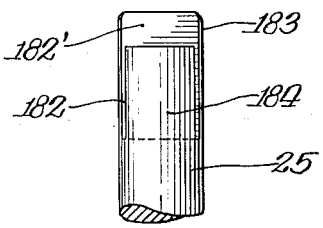
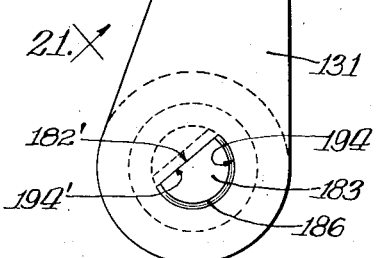
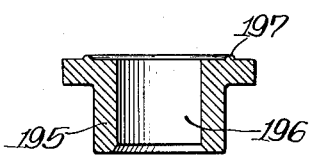
INVENTORS,
William P. Gallagher,
BY Carl Weber,
Brown, Jackson, Boettcher & Dienner
Attys.

Patented Mar. 23, 1954

2,673,258

UNITED STATES PATENT OFFICE 2,673,258

AUTOMATIC TIMING MECHANISM

William P. Gallagher and Carl Weber, Chicago, Ill., assignors to International Register Company, Chicago, Ill., a corporation of Illinois Application January 26, 1946, Serial No. 643,599

18 Claims. (Cl. 200—38)

1

The present invention relates to automatic timing mechanism, such as time switches, interval switches, interval timers and the like. More particularly, the main features of the invention pertain to that type of automatic timing mechanism which can be preset so as to cause one or more desired operations to occur at a certain preselected hour or hours of the day or night. For example, the device might be employed to open or close an electrical switch at a predetermined time or times of the day or night, or to open or close a valve at a predetermined hour of the day or night. In the exemplary embodiment herein disclosed, we have shown the invention in the form of an automatic time switch for electric stoves, electric ovens and the like, whereby the housewife can set the time switch to automatically start and stop a cooking operation at predetermined hours, or can set the device to result in a cooking operation of predetermined duration and to have this operation stop at a preselected time.

The automatic timer herein disclosed is in many respects similar to the automatic timer disclosed in the prior patents of William P. Gallagher and Alfred W. Gardes, No. 2,302,625 and No. 2,301,942, both issued November 17, 1942, and the timer of the instant application may be considered as an improvement upon the timer of these prior patents.

One of the features of the improved construction of timer herein disclosed is the greater accuracy of timing in the automatic operation of the device, i. e. the automatic closing of the switch to start the cooking operation and the automatic opening of the switch to stop the cooking operation are more accurately related to the start-cooking and stop-cooking times which are actually set up on the automatic timer. In some of the automatic timers of the prior art, there may be errors as large as a quarter-hour or half-hour either in the closing of the switch or in the opening of the switch, or both, and if the particular cooking operation taking place at that time happens to be one of normally short duration such error or errors may result in a faulty cooking operation. In the construction herein disclosed, the timing accuracy of the device is approximately as accurate as the human element in the setting of the device viz. the timer performs just about as accurately as a human being can set the indicating elements on the timer.

Another feature of the construction herein disclosed is its greater facility and simplicity of assembly. This improved construction minimizes or eliminates the possibility of faulty operation

2 or inaccurate timing arising because of assembly variations occurring between one unit and the next in the assembly operation.

Another feature is the ability to quickly and easily replace the cover glass of the clock in the event of breakage; also the ability to quickly and easily substitute the electric motor unit in the event of motor trouble.

Another feature of the present invention is an improved construction of electric switch for opening and closing the heating circuit of the stove or oven pursuant to automatic actuation by the timer.

Another feature resides in an improved mounting for securing the manually setting knobs and levers to their respective setting shafts.

Other features, objects and advantages of the invention will be apparent from the following detail description of certain preferred embodiments thereof. In the accompanying drawings illustrating such embodiments:

Figure 1 is a front elevational view of the improved timer;

Figure 2 is an edgewise sectional view taken approximately on the plane of the line 2—2 of Figure 1 and looking in the direction of the arrows;

Figure 3 is a section somewhat similar to Figure 2, but taken through the axis of the clock dial, minute and hour hands and rotative assembly, as shown by line 3—3 of Figure 4;

Figures 4, 5 and 6 are transverse sectional views taken on successive levels of the assembly, corresponding approximately to sections taken on the plane of the lines 4—4, 5—5 and 6—6 respectively, of Figure 2;

Figures 7 and 8 are fragmentary operating views showing different stages in the operation of the timer;

Figure 9 is a fragmentary elevational view of the improved electric switch, corresponding to a section taken at 9—9 of Figure 3;

Figure 10 is a detail sectional view taken approximately on the plane of the line 10—10 of Figure 5;

Figure 11 is a broken-away detail plan of a portion of Figure 6;

Figure 12 is a detail section taken on the line 12—12 of Figure 2;

Figures 13 and 14 are views similar to Figures 7 and 8 but showing a modified construction;

Figure 15 is a sectional view on an enlarged scale showing an improved mounting for securing the manually actuated setting knobs to the ends of their respective setting shafts;

Figure 16 is a bottom view of the under side of one of these knobs, showing the stepped offset in the bore or socket of the knob;

Figure 17 is an end view of the shaft, showing the slot which divides the end portion of the shaft into two resilient tongues;

Figure 18 is a side view of the end of the shaft, showing the stepped offset in the shaft;

Figure 19 is a plan view on an enlarged scale showing an improved mounting for securing the manually actuated lever to the switch actuating shaft;

Figure 20 is a detail sectional view of the hub which is welded to this lever; and Figure 21 is a transverse sectional view taken on the plane of the line 21—21 of Figure 19.

Figure 1 illustrates the automatic timer as it is viewed from the front of the electric range, the clock face being disposed substantially vertically so that it is readily visible from the front of the range. The mechanism is enclosed within a rectangular main housing 15, from the front of which extends a smaller rectangular supplemental cover or housing 16. Formed centrally of the supplemental cover 16 is a depressed circular opening 17 behind which is set the cover glass 18 (Figure 3) constituting the transparent front of the clock dial. The supplemental cover 16 is detachably secured to the main housing 15 by two or more attachment posts 19 which project inwardly from the supplemental housing at spaced points and are adapted to have releasable snap engagement with spring clips 20 which are secured to the front side of the main housing by bolts or screws 20a (Figures 2 and 12). These spring clips are of hairpin or U-shape, and the posts 19 are adapted to pass inwardly between the sides of the spring, each post having a pointed front end to spread the spring, and then having an annular groove 19b into which the sides of the spring snap for releasably holding the supplemental cover to the main housing. The pointed end of each post passes into a hole 20b in the main cover directly under the spring clip, whereby to assist in holding the supplemental cover against lateral shifting on the main housing. The free ends of the spring clips 20 pass through rectangular openings 20c in the main housing to hook under the front wall of the main housing. This construction enables the cover 16 to be readily snapped off the main housing 15 to replace a broken cover glass 18, and then snapped back into place again. The cover glass 18 may be rectangular or circular as desired, and it is held against sidewise shifting movement by a plurality of lugs 18a (Figure 2) which are punched forwardly from the front wall of the main housing. If desired one or more of these lugs may have its extremity bent over the outer surface of the glass, as indicated at 18b in Figure 3, this bent end being merely straightened out to remove the glass. The hour hand 21 and minute hand 22 rotate behind this glass 18 and cooperate with the clock dial numerals 23. The numerals 23 are shown as being marked on the outer surface of the supplemental housing 16, but it will be understood that they might also be marked upon a dial card disposed in back of the cover glass 18. As shown in Figure 3, the main housing 15 is formed with a forwardly extending circular flange 24 which aligns with the rearwardly extending circular flange 17 projecting inwardly from the supplemental housing 16, and the cover glass 18 is confined between these two matching circular flanges 17 and 24. The minute hand 22 is driven from the central minute hand spindle 25, and the hour hand 21 is driven from the surrounding hour hand sleeve 26. These clock hands are shown as being driven from a synchronous alternating current motor 27, although it will be understood that they might be driven from a conventional clock spring. The electric motor assembly includes a self-contained speed reducing gear train enclosed within a gear train housing 28. Tongues 29 (Figure 2) projecting laterally from the housing 28 receive fastening screws 31 which thread into tapped holes in an assembly plate 32 for attaching the motor 27 and housing 28 to said plate 32, the latter constituting the main frame element of the entire assembly. The power takeoff from the gear housing 28 is in the form of a shaft 33 which has its rear end projecting rearwardly from the housing 28 for mounting a rear drive gear 34, this shaft also having its front end projecting forwardly through a hole 30 in the mounting plate 32 for mounting a front driving gear 35, these two gears rotating at the same speed. The front driving gear 35 can pass freely through the hole 30, which enables the electric motor assembly to be readily removed from the timer as a unit by simply removing the mounting screws 31, this motor assembly including the electric motor 27, gear housing 28, shaft 33 and back and front gears 34 and 35, all being removable as a unit. This can be readily accomplished by merely removing the back housing plate 40 and then releasing the screws 31, from which it will be seen that the motor unit can be very easily substituted if its operation becomes faulty.

The rear gear 34 of the motor assembly meshes directly with a gear 36 which is secured to the inner end of the minute hand spindle 25, whereby the minute hand is driven at a rate to make one complete revolution every hour. The front driving gear 35 meshes with a first idler gear 38 which in turn meshes with a second idler gear 39, and the latter transmits rotation to a relatively large spur wheel or time wheel 41 which is secured to the hour hand sleeve 26, the ratio of the gears 35, 38, 39 and 41 being such as to rotate the time wheel 41 and hour hand 21 through one complete revolution every twelve hours. The minute hand spindle 25 rotates within a stationary mounting sleeve 42, and the hour hand sleeve 26 rotates around the outside of this mounting sleeve. Said mounting sleeve is formed with a staking collar or flange 43 which is adapted to be pinned or staked to the front side of the frame plate 32, the rear portion of this mounting sleeve extending through the plate 32 to provide a long length of bearing support for the minute hand spindle. The front end of the minute hand spindle extends outwardly through a central aperture 44 in the cover glass 18, and has secured thereto an adjusting knob 45 which enables the clock hands to be set by rotating the minute hand spindle through the knob 45. The knob 45 can be rotated in either direction for manually setting the clock hands in either direction, such manual setting being accommodated by a friction slippage clutch or the like which is preferably embodied directly within the speed reducing gear housing 28 for enabling the gears 34, 35 to be manually rotated forwardly or backwardly independently of the rotation of the rotor of motor 27.

Referring to Figure 3, the continuously driven time wheel 41 (which makes one revolution every twelve hours) is assembled over a shouldered step 46 on the hour hand sleeve 26, this time wheel being staked or otherwise secured to the sleeve for continuously driving the hour hand through the medium of the sleeve. Formed on the sleeve 26, back of the time wheel 41 is another shouldered step 47 on which is mounted a ratchet wheel 48, this ratchet wheel, however, being free to rotate relatively to the time wheel and to the hour hand sleeve. This ratchet wheel normally standing stationary while the time wheel 41 proceeds with its continuous rotation. The continuously rotating time wheel 41 has mounted thereon a pawl 49 (Figure 5) which rotates continuously with the time wheel 41 but which is adapted to effect brief engagement with the ratchet wheel 48 at the preselected times when the electrical switch is to be actuated for starting or stopping the cooking operation. This pawl 49 is adapted to be actuated by an actuating member 51 which is also mounted on the time wheel 41 so as to rotate continuously therewith. This actuating member 51 is adapted to be actuated at the preselected times by coming into contact with the two manually settable tripping pins indicated at 52 and 53 in Figure 5. These tripping pins can be set in different angular positions around the center of the rotative assembly 21, 22, 41. The tripping pin 52 can be manually set to start the cooking operation at any preselected time, and the tripping pin 53 can be manually set to stop the cooking operation at any preselected time, or the angular distance between these two pins can be manually set to establish a certain number of cooking hours therebetween. These two tripping pins are carried by two concentric indicator disks 54 and 55 which are mounted for free rotation around the outside of the hour hand sleeve 26. The start-cooking or switching closing pin 52 is carried by the rear disk 54, and the stop-cooking or switch opening pin 53 is carried by the front disk 55. Referring to Figure 4, the rear disk 54 is formed with a relatively long arcuate slot 56 therein, and the tripping pin 53 which is carried by the front disk 55 projects rearwardly through this slot 56 so that by rotating either disk relatively to the other the angular distance between the two tripping pins can be adjusted as desired, and the angular positions of the tripping pins around the clock dial can be adjusted as desired. These two indicator disks have gear teeth around their peripheries, and the front disk 55 is adapted to be rotated by manual rotation of a right hand adjusting knob 58, and the rear indicator disk 54 is adapted to be adjusted by rotation of a left hand adjusting knob 59. These two adjusting knobs are mounted on adjusting shafts 61 and 62 respectively, which carry spur pinions 63 and 64, the pinion 63 meshing with the front indicator disk 55 and the pinion 64 meshing with the rear indicator disk 54. The pinions 63 and 64 are preferably of the shrouded type comprising front and rear flanges with the spur teeth disposed therebetween, these shrouding flanges maintaining each pinion exactly in the plane of its respective indicator disk, or possibly causing the indicator disk to flex slightly in its rotative movement into mesh with its respective pinion, these indicator disks being relatively thin and hence being capable of flexing freely. A friction drag is imposed upon each of the pinions 63 and 64 by identical friction washers 66 which are pressed against the back sides of the pinions by compression springs 67. Each friction drag washer has a splined connection with the front end of a nonrotating sleeve 68 which has its rear end staked or otherwise rigidly fastened in the frame plate 32. The splined mounting of the drag washer on the sleeve 68 permits the drag washer to slide axially toward its respective spur pinion 63 or 64, but prevents the drag washer from rotating. This friction drag imposed upon the pinions 63 and 64 must be sufficient to hold the tripping pins 52 and 53 in any of their set positions, so as to prevent either of these pins being picked up and dragged along by the rotating actuating member 51 which rotates continuously with the time wheel 41. The adjusting shafts 61 and 62 have bearing support in the frame plate 32 and sleeves 68, and may also have bearing support in aligned holes in the housings 15 and 16. A U-shaped detent washer 69 is forced into an annular groove in the lower end of each shaft 61 and 62 on the back side of frame plate 32 for holding the assembly in place. Referring to Figure 3, the two indicator disks or dials 54 and 55 are loosely assembled over the hour hand sleeve 26, and are maintained in spaced relation on this sleeve by an intervening spacing washer 71. The outer dial 55 abuts a washer 72 under the hub of the hour hand 21, and the rear dial 54 is held against shifting inwardly along the sleeve 26 by a plurality of angularly spaced supporting pins 73 which have their base portions anchored in the supporting plate 32. As shown in Figure 5, these pins project forwardly just beyond the periphery of the continuously driven time wheel 41, whereby the tip ends of the pins can bear against the back side of the indicator disk 54, as shown in Figure 2. This supporting function of the pins 73 is also assisted by a bracket 74 (Figure 3) which is secured to the frame plate 32 and has an inward extension which bears against the under side of the indicator dial 54.

Referring now to the cooking indicia which is marked on the indicator dials 54 and 55, it will be seen from Figure 4 that the front dial 55 carries a marking arrow or pointer 75 which is designated "Stop Cooking." Rotation of the right hand manually actuated knob 58 rotates this front dial 55 to place the "Stop Cooking" pointer 75 in registration with any desired time numeral 23 on the clock dial. For example, in Figure 1 this front indicator dial has been adjusted through the manual knob 58 so as to place the "Stop Cooking" pointer 75 in registration with the 6:00 o'clock marking of the clock dial. It will be understood that this setting which has thus been given to the dial 55 has placed the second tripping pin 53 at a predetermined angular position (Figure 4) which will cause the electrical switch to be opened at 6:00 o'clock. This front dial 55 is also provided with an arcuate slot or sight window 77 which is preferably located just inside of the "Stop Cooking" marker 75. This slot 77 is provided along its inner margin with a central marking pointer 78, and the slot and pointer have associated therewith the indicia "Cooking Hours." The "Cooking Hours" pointer 78 is adapted to register with a series of dial numerals 79 and associated dial markings which are printed on the rear dial plate 54 so as to appear in the sight window 77. Rotation of the left hand manual knob 59 rotates this back dial plate 54 for presenting any one of the "Cooking Hour" numerals 79 in registration with the marking pointer 78 for setting up a cooking interval of predetermined duration on the automatic timer. It will be noted that any such setting given the rear dial disk 54 places the first tripping pin 52 at a predetermined angular point around the clock dial, whereby to cause tripping of the electric switch at such point as to insure that there will be a cooking interval of the desired duration.

Referring now to the detailed construction and operation of the pawl mechanism which is tripped by these two tripping pins 52 and 53, to close and to open the electric switch, it will be seen from Figure 5 that the actuating member 51 has a pawl nose 81 associated therewith in such position as to engage the tripping pins 52 and 53 during the continuous rotation of the time wheel 41. The nose 81 projects integrally from a dog or lever 82 which is pivotally mounted upon the actuating member 51 in such manner that if the radial forward edge of the nose 81 engages one of the tripping pins 52 or 53 in the normal operation of the device, the dog 82 is operative to oscillate the actuating member 51, but if the reverse slope of the nose 81 should encounter one of the tripping pins in any resetting of the clock or in any angular setting of the tripping pins 52 and 53, the dog 82 can oscillate inwardly without compelling concurrent motion of the actuating member 51. A headed pivot stud or rivet 83 passes through the dog 82 and through the actuating member 51 and has its other end riveted over on the back side of the time driven wheel 41. As shown in Figure 10, the dog 82 is provided with a hole 84 of larger diameter than the shank of the rivet 83 so as to permit the dog to oscillate inwardly relatively to the rivet 83 if contact should be established between the nose 81 and tripping pins 52, 53 in the reverse direction. This pivotal freedom of the dog 82 relatively to the actuating member 51 occurs around a pivot center 86 which can be in the form of a pivot pin extending through the members 82 and 51, or it can be in the form of a lug punched inwardly from the dog 82 and having pivotal mounting within an aperture formed in the actuating member 51. The dog 82 is normally held in its outwardly projected position shown by a compression spring 89 which is confined between a tongue 91 projecting from the dog 82 and a tongue 92 projecting from the member 51. The above described assembly consisting of the two parts 51 and 82 is normally held in the inwardly retracted position shown in Figure 5 by a tension spring 93 which has one end engaging over a hook 94 projecting from member 51 and which has its other end hooked over a lug 95 punched forwardly from the time driven wheel 41. Spring 93 may be set down into a slot 96 punched out of the time driven wheel 41, so as to make the assembly more compact in an axial dimension.

The actuating member 51 is adapted to function as a hammer element for striking an impact blow against a pawl actuating arm 97. Said arm 97 is adapted to oscillate the pawl 49, the arm and the pawl being fastened together by a connecting pin 98 which has its upper end staked to the arm 97 above the time wheel 41 and which has its lower end staked to the pawl 49 below the time wheel 41. A tension spring 99 has one end hooked over a hook arm 101 projecting from the actuating arm 97, and has its other end hooked to a lug 102 punched upwardly from the time wheel 41, this spring 99 being set into a recess 103 formed in the time wheel. In the normal position of the parts illustrated in Figure 5, the hammer end 51' of the hammer member 51 is normally held pressed against the striker nose 97' of the pawl arm 97, this relation of the parts being maintained by the tension of the spring 93, which overcomes the tension of the spring 99. In this position of the parts, the nose 49' of the pawl 49 is held out of engagement with the teeth of the ratchet wheel 48. In such position of the parts, the spring 99 is maintained in a shifted position to one side of the line of dead center alignment extending between shaft 98 and hook 102, this spring 99, however, tending constantly to oscillate the arm 97 and pawl 49 in a clockwise direction to the point where the spring 99 will be in such line of dead center alinement, as shown in Figures 7 and 8. From the foregoing it will be seen that when the nose 81 of the hammer member 51 engages one of the tripping pins 52 or 53 it causes the hammer member to oscillate in a counterclockwise direction around the axis of the pivot stud 83 while the hammer member 51 is still moving bodily with the time driven wheel 41 in the clockwise direction indicated by the arrow in Figure 5. This outward swinging or cocking movement of the hammer element 51 withdraws the impact end 51' of the hammer from the impact nose 97' of the pawl actuating arm 97, thereby permitting the pawl actuating arm and the pawl 49 to swing in a clockwise direction around the pivot 98 for moving the nose 49' of the pawl into the teeth of the ratchet wheel 48. This clockwise rotation of the pawl 49 around the axis of the pivot 98 occurs concurrently with the clockwise rotation of the entire assembly relatively to the ratchet wheel 48, so that the nose 49' of the pawl is fed gradually into one of the tooth spaces and continues to remain in that tooth space momentarily while the pawl 49 continues to oscillate around the pivot 98 relatively to the time wheel 41. In consequence thereof, the pawl nose 49' arrives in a relative position with regard to the ratchet wheel 48 which is spaced rearwardly the equivalent of one or more tooth spaces, i. e. the pawl nose remains in the tooth space that it originally entered, but the nose is allowed to oscillate backwardly while its pivot axis 98 moves forwardly, this relative rearward movement of the pawl nose continuing until the spring 99 arrives in dead center alinement between the pin 98 and the hook 102, as shown in Figure 7. At this time the hammer element 51 is substantially in its retracted position, and as soon as the nose 81 snaps off the edge of the tripping pin 52 or 53 the hammer element is swung inwardly with a quick blow under the action of the tension spring 93, this blow being imparted to the pawl arm 97 and quickly oscillating the pawl 49 for imparting a quick oscillatory movement to the ratchet wheel 48. This oscillatory movement may only be through a distance corresponding to one or two of the ratchet teeth of said wheel, enough to enable the nose 49' of the pawl 49 to swing clear of the teeth of the ratchet wheel. This brief actuation of the ratchet wheel is utilized to control the movement of the electrical switch from its open circuit position to its closed circuit position, and thence to its open circuit position, in the following manner.

Referring to Figure 6, it will be seen that the ratchet wheel has a clip or bracket arm 106 riveted to its back side, this arm being spaced rearwardly from the plane of the teeth of the ratchet wheel so as not to interfere with the motion of the pawl 49 into and out of engagement with the ratchet wheel at any point around its circumference. Projecting rearwardly from the bracket arm 106 is a stop pin or stud 108 which is adapted to cooperate with a multiple stop plate 109. Said plate 109 is secured to a switch actuating shaft 111 around the axis of which the plate 109 swings, this plate being formed with a relatively long arcuate slot 112 having angularly disposed stop shoulders 113 and 114 at spaced points along the length of the slot. The time controlled stop pin 108 comprises a square shank portion which extends through the slot 112 in position to cooperate with the shoulders 113 and 114. The rear end of the pin 108 is provided with an annular groove in which is hooked one end of a tension spring 118, the opposite end of this spring being hooked to a lug 119 punched backwardly from the frame plate 32. As shown in Figure 11, an opening 121 is punched out in the plate 32 so as to provide a stop tongue of metal 122 against which the square shank of the stop pin 108 is adapted to strike for limiting the counterclockwise rotative movement of this stop pin under the action of the spring 118. When the stop shoulder 113 of the stop plate 109 is bearing against the pin 108 (Figure 7) the stop pin can be tripped from this shoulder 113 by the above described action of the pawl 49 imparting a quick clockwise throw to the ratchet wheel 48, such causing the pin 108 to swing downwardly and to the left for freeing the stop shoulder 113. Similarly, when the second stop shoulder 114 is bearing against the stop pin 108 (Figure 8) the stop pin can be released from said stop shoulder by the action of the pawl 49 imparting a momentary oscillatory throw to the ratchet wheel 48 in a clockwise direction for swinging the stop pin 108 downwardly and to the left clear of the shoulder 114.

The multiple stop plate 109 is spring impelled in a clockwise direction by a helical torsion spring 124 which is coiled about the shaft 111, having its rear end hooked under a lug 125 punched from plate 109 and having its front end hooked to the bearing bracket 74. As shown in Figure 3, the upper portion of the switch actuating shaft 111 has bearing support in the bearing bracket 74, and the lower or rear portion of this shaft has bearing support in a bearing bushing 127 anchored in the insulating base plate 128 at the electrical switch. Secured to the front end of the shaft 111 is the hub of a manually actuated lever 131 through which the apparatus is adapted to be manually set, either in its automatic position subject to automatic control, or in its normal switch-on position where it is not subject to automatic control, and with the switch contacts closed. This lever 131 projects outwardly through a slot 132 in the side wall of the supplemental housing 16, and the lever may be provided with a thumb piece, knob or the like. Figures 5 and 6 illustrate the multiple stop plate 109 in this normal switch-on position where the device is not subject to automatic control and where the switch contacts are closed. The multiple stop plate 109 is moved into this position by exerting an upward counterclockwise force against the manually actuated lever 131 for swinging the plate 109 downwardly and toward the right in opposition to the action of the spring 124, this spring being under tension at all times. The plate 109 is frictionally held in this normal on position by the action of a resilient friction finger 134 under which the lower edge of the plate 109 is adapted to be forced when the plate reaches this lowermost position. As best shown in Figure 2, the leading edge of this friction arm 134 has an upwardly sloped lip and a downwardly bent hump, and the plate 109 may be provided with a slot 135 in which the bump is adapted to snap when the plate is forced back under the friction finger. The finger 134 is formed integral with an apertured base or clip 136 through which passes the right hand adjusting shaft 61 which adjusts the stop cooking dial 55. The compression spring 67 surrounding this shaft reacts rearwardly against the base clip 136. The stamping is formed with rocker extensions 137 at opposite sides of the stamping, which bear against the plate 32 at such points relatively to the line of action of the spring 67 that the detent finger 134 has a spring pressed up and down rocking action as it snaps into and out of the detent slot 135. A locking tongue 138 projects rearwardly from the stamping and extends into an aperture in the frame plate 32 for holding the stamping against rotative movement around the axis of the shaft 61. As will be hereinafter described, when the plate 109 is in this normal switch-on position the contacts of the electrical switch are closed so that the circuit is completed through the automatic timer, thereby placing the control of the oven under a manual switch which the housewife can turn on and off as desired. This manual control switch is shown in the aforemention prior Patents 2,302,625 and 2,301,942. When the automatic timer is to be placed under automatic control, the housewife sets up the desired time settings by appropriate rotation of the knobs 58 and 59 to predetermine the length of the cooking operation, and to predetermine the stop cooking time. Thereupon, she swings the manual lever 131 to release the multiple stop plate 109 from its friction grip under the friction finger 134, this action bringing the stop shoulder 113 up against the time controlled stop pin 108 (see Figure 7). When the automatic actuation of the ratchet wheel 48 occurs, as previously described, the resultant downward movement of the stop pin 108 frees the shoulder 113 so that the stop plate 109 can quickly swing through its next step of movement under the action of the spring 124 for bringing the next stop shoulder 114 up against the pin 108. It will be noted that the wide portion 112a of the slot 112 is joined by a sloping cam surface 112b with the narrow portion 112c of the slot. When the stop pin 108 swings downwardly within the wide portion 112a so as to free the shoulder 113, the resulting rotation of the plate 109 brings the cam slope 112b up against the stop pin for camming the pin backwardly into the narrow portion 112c of the slot. When the stop pin is within this narrow portion it is in position to be engaged by the second stop shoulder 114. The second tripping movement of the stop pin 108 in a downward direction enables this pin to pass out through the tapered front end 112d of the slot, thereby freeing the second shoulder 114. When this second shoulder 114 is freed, the multiple stop plate 109 immediately swings through the last step of its clockwise rotation under the torsion of the spring 124. This last movement of the plate 109 opens the electrical switch and terminates the cooking operation. In restoring the plate 109 to its set position by counterclockwise rotation exerted against the resetting lever 131, the tapered throat 112d guides the stop pin 108 into the slot 112.

The electrical switch is indicated in its entirety at 141 in Figure 9, the several parts of this switch being assembled upon an insulating base 128 which is secured to and spaced rearwardly from the frame plate 32 by a plurality of spacing posts 142. Mounted on the lower portion of the shaft 111 to rotate therewith is a switch actuating cam 143 having four switch actuating positions formed in its periphery viz. a cam valley 144 for closing the switch, a cam hump 145 for opening the switch, a cam valley 146 for closing the switch and a cam hump 147 for opening the switch. Cooperating with the cam is a cam follower 148 having a forwardly extending finger 149 which rides directly on the periphery of the cam for responding to the humps and valleys. This cam follower 148 may be composed of metal, and the inner end thereof is riveted or otherwise secured to a switch actuating plate 151 composed of insulating material. In the step by step rotative movement of the cam, the follower 148 shifts to and fro carrying the insulating plate 151 with it. The follower 148 is guided for this reciprocatory movement by providing it with an elongated slot 152 which engages over a reduced shank portion at the lower end of the shaft 111, the sliding movement of the slot along this shank portion constituting a guide for the cam follower. If desired, the insulating plate 151 may be provided with a slot 154 for increasing the electrical creepage distance between contact springs 157, 157'. The plate 151 is formed with actuating shoulders 156 in its opposite edges adapted to engage the tip extremities of two resilient spring blades 157, 157'. These spring blades have their opposite ends anchored in load terminal posts 158, 158' anchored to the insulating base plate 128. The free ends of the spring blades carry movable contacts 159, 159' which are adapted to engage with cooperating stationary contacts 161, 161' secured to stationary line terminal posts 162, 162', the latter being suitably anchored to the insulating base plate 128. The load terminal posts 158, 158' are formed with extensions which project through the insulating plate 128 and receive screws 163 for attaching conductors to the load terminal posts, and, likewise, the line terminal posts 162, 162' are formed with extensions which project through the insulating plate 128 for receiving screws 164 by which conductors are connected to the line terminal posts. The two pairs of switch contacts 159, 161 and 159', 161' are preferably connected one in each circuit conductor leading to the heating element of the oven or range, whereby both sides of the circuit are opened and closed in controlling the energization of this heating element. It will be evident from the foregoing that when the cam follower finger 149 is engaging in either of the cam valleys 144 or 146 the T-shaped plate 151 occupies a retracted position which allows the switch contacts 159, 161 and 159', 161' to remain engaged, and when this follower finger 149 occupies a position on either one of the cam lobes 145 or 147 the T-shaped plate 151 is caused to shift to the right for flexing the switch blades into positions which separate the movable contacts 159, 159' from the stationary contacts 161, 161'. Figure 9 illustrates the switch in the position it occupies when the multiple stop plate 109 is in its normal "on" position shown in Figure 6. As this stop plate 109 moves successively into its second, third and fourth positions, with shoulder 113 against stop pin 108, then with shoulder 114 against stop pin 108, and finally with the slot 112 clear of the stop pin 108, the cam 143 moves progressively to its second, third and fourth positions respectively, so as to cause the lobe 145, then the valley 146, and finally the lobe 147 to move under the cam follower 149, whereby the switch contacts are opened, closed and again opened by these successive movements of the multiple stop plate 109. The back of the timer housing 15 is closed by the back plate 40 which is secured to the rear end of the spacing posts 142.

Referring now to the operation of the automatic timer, the timer normally stands in the normal closed circuit position illustrated in Figures 5, 6 and 9 so that the energization of the heating element of the oven or range can be turned on or off through the medium of the conventional manual control switch (not shown) which is always provided for the manual control of said heating element. At this time, the manual lever or thumb piece 131 lies close to the side of the supplemental casing 16 in approximately the angular relation shown in Figure 2. Assume now that it is desired to have the timer operate through an automatic cycle, say for starting a cooking operation which is to end at 6:00 o'clock and which is to be of three hours duration, as mentioned above. For the performance of this time cycle, the stop cooking adjusting knob 58 is rotated so as to present the stop cooking pointer 75 at the 6:00 o'clock marking on the clock dial, and the cooking hours adjusting knob 59 is rotated to set the numeral "3" of the dial 54 in registration with the cooking hours marker 78, both as indicated in Figures 1 and 4. Thereupon, the manual lever or thumb piece 131 is forced outwardly in a clockwise rotation from the side of the housing so as to free the multiple stop plate 109 from the friction detent finger 134, thereby swinging this plate into the "set" position illustrated in Figure 7, with the first stop shoulder 113 abutting against the time controlled stop pin 108. In this position of the parts, the cam lobe 145 has moved into alignment with the cam follower finger 149 and has thereby opened the switch contacts. The setting operation is now completed, and the timer is in readiness to go through its automatic cycle at the prescribed times. This setting operation can, of course, be performed in the morning, noon or any hour in the afternoon, preceding the time when the cooking operation is to start. For example, the clock hands in Figure 1 illustrate that the set condition has been established in the timer at 6:15 o'clock. In this set position, the cam 143 has its lobe 145 engaging under the finger 149 for holding the switch contacts separated. As the time approaches for starting the cooking operation, the continuously driven time wheel 41 brings the tripping nose 81 of hammer member 51 into engagement with the first tripping pin 52, as shown in Figure 7. This causes the hammer member 51 to oscillate outwardly in a back stroke, thereby enabling the pawl arm 97 and pawl 49 to oscillate in a clockwise direction around the pin 98 for swinging the nose of the pawl 49 into the teeth of the ratchet wheel 48. When the tripping nose 81 snaps off the edge of the tripping pin 52 the hammer element 51 swings inwardly and strikes a blow against the pawl arm 97 for quickly oscillating this arm and the pawl 49 in a counterclockwise direction around the pivot pin 98. This imparts a short quick throw to the ratchet wheel 48, thereby oscillating the stop pin 108 downwardly out of contact with the stop shoulder 113. In consequence, the multiple stop plate 109 is freed for a quick one step advancement to the next position illustrated in Figure 8. This one step advancement of the stop plate moves the cam valley 146 under the cam follower finger 149 for permitting the switch contacts to move to closed circuit position. This automatically starts the cooking operation. When the stop pin 108 was caused to swing downwardly from the first stop shoulder 113 it moved into the path of the cam slope 112b of multiple stop plate 109, which cam slope moved the stop pin back into the narrow part 112c of the slot in position to be struck by the second stop shoulder 114. This is the position of the stop pin and multiple stop plate shown in Figure 8, corresponding to the closed circuit position of the electrical switch 141. The cooking operation then proceeds for substantially three hours, and as the time approaches for stopping the cooking operation the tripping shoulder 81 comes into contact with the second tripping pin 53, as shown in Figure 8. This brings about a repeat performance of swinging the hammer element 51 outwardly in a back stroke, thereby permitting the pawl arm 97 and pawl 49 to oscillate clockwise for swinging the nose of the pawl 49 into the teeth of the ratchet wheel 48. When the tripping nose 81 snaps off the second tripping pin 53, the hammer element 51 swings inwardly and strikes the pawl arm 97, thereby imparting a quick oscillatory motion to the ratchet wheel 48 through the pawl 49. This short throw of the ratchet wheel 48 swings the stop pin 108 out of engagement with the second stop shoulder 114 on stop plate 109 permitting this stop plate to swing through the final step of its clockwise motion under the action of the spring 124. This final step brings the lobe 147 of the cam 143 under the cam follower finger 149 for moving the switch contacts to open circuit position. The cooking operation has now been interrupted, and the cycle of the timer has been completed. Before attempting to have the automatic timer go through another automatic cycle, or before attempting to place the heating element under manual control, the housewife should restore the automatic timer to its normal position by swinging the setting lever or thumb piece 131 in a counterclockwise direction, whereby to swing the multiple stop plate 109 back to the normal position illustrated in Figure 6, in which position it is held by the friction detent finger 134, and in which position the switch contacts are closed. If the heating element is not to be energized at this time, the circuit is opened at the conventional manual control switch.

In Figures 13 and 14 we have illustrated a modified construction in which momentary clutching engagement is established between the time driven wheel 41 and the ratchet wheel 48 by a simplified form of pawl mechanism which does not utilize any actuating member for striking an impact blow against the pawl. In this modified construction, the pawl which effects the clutching engagement is designated 49a, and is pivotally mounted on the time driven wheel 41 by a headed pivot pin 171 which is anchored to the wheel 41 and which passes through a slot 172 in the pawl, this slot permitting a limited endwise shifting movement of the pawl relatively to the time driven wheel in addition to a pivotal movement. The actuating end of the pawl is bent rearwardly and thence forwardly at 49b to pass back through a slot 174 punched out of the wheel 41, so as to dispose the nose 49c of the pawl directly in the plane of the ratchet teeth on ratchet wheel 48 which lies directly back of time wheel 41. Normally, the nose 49c is held out of engagement with the ratchet teeth 48' by the action of a spring 175 which is hooked to the pawl at 176 and to the time wheel at 177, this spring normally holding the offset portion 49b of the pawl pressed outwardly against the outer margin of the slot 174. The opposite end of the pawl has a tripping flange 178 bent forwardly from the plane of the pawl, this flange having a high point 178a and sloping shoulders 178b, 178c leading up to the front and rear ends of the high point 178a. This tripping surface 178a is adapted to coact with the two tripping pins 52 and 53, much in the same manner that the nose 81 of the previously described embodiment coacted with these tripping pins.

Referring now to the operation of this modified embodiment, Figure 13 shows the normal position of the pawl 49a on the time wheel 41, with the tripping surface 178a of the pawl approaching the set position of the first tripping pin 52. At this time, the timer is in the "set" position with the stop shoulder 113 of the multiple stop plate bearing against the stop pin 108, this corresponding to the switch open position. Figure 14 illustrates the pawl 49a in the act of performing a clutching operation between the time wheel 41 and the ratchet wheel 48 for the purpose of tripping the stop pin 108 free of the shoulder 113 for permitting the multiple stop plate 109 to actuate the electric switch to its closed position. This tripping operation has been brought about by the camming action between the tripping pin 52 and the tripping surface 178a, causing the pawl nose 49c to swing into the teeth of the ratchet wheel for clutching the ratchet wheel to the time driven wheel for a short interval, sufficient to swing the stop pin 108 clear of the stop shoulder 113, whereupon the multiple stop plate swings to its next position and the switch is moved to its closed position. When the tripping surface 178a of the pawl reaches the set position of the next tripping pin 53, the same operation of momentarily clutching the ratchet wheel 48 to the time driven wheel 41 is repeated, the resulting oscillatory movement of the ratchet wheel releasing the stop pin 108 from the second stop shoulder 114 and opening the switch to stop the cooking operation. In this modified embodiment, the reverse slope 178c on the pawl 49a accommodates any reverse movement of the time driven wheel in manual setting operations of the clock hands. It will be understood that a tension spring 118 is connected to the stop post 108 to normally urge this post and the ratchet wheel in a counterclockwise direction. The slot 121' in the plate 32 permits the post to extend through the plate for connection to the spring. In this construction, the multiple stop plate 109 is formed with the stop shoulders 113 and 114 formed in an arcuate outer edge, without any arcuate slot 112 or cam surface 112b.

Figures 15 to 18 illustrate the improved mounting of the knobs 45, 58 and 59 on their respective shafts 25, 61 and 62, and Figures 19 to 21 illustrate the improved mounting of the manually actuated lever 131 on the switch actuating shaft 111, these two mountings being substantially the same in construction and operation. Figures 15 to 18 illustrate the shaft 25 as typical of the three setting shafts 25, 61 and 62, and also illustrate the knob 45 as typical of the three manually actuated setting knobs 45, 58 and 59. The shaft is slitted down from the end, preferably by a saw, to form a longitudinal slot 182 which divides the end of the shaft into two tongues 183 and 184 of sufficient length so that the outer portions of these tongues can be sprung towards each other resiliently as the knob is forced down over the shaft. The right hand tongue 184 is cut off below the end of the left hand tongue 183, so as to form a stepped offset in the end of the shaft, this stepped offset exposing the transverse flat inner surface 182' extending down along tongue 183 and defining one side of the saw slot 182. This transverse flat inner surface 182' functions as a torque transmitting surface for the shaft. The slot 182 is preferably located slightly to the right of the center of the shaft so that the left hand tongue 183 will have greater sectional thickness for torque transmitting purposes. The upper end of the longer torque 183 has its edge beveled or chamfered as indicated at 186 to facilitate forcing the knob down over the end of the shaft.

The knob 45 may be composed of a plastic material or of metal, and may have any outer contour for gripping purposes, such as a transverse raised rib 188, or a knurled flange or polygonal head, whichever is preferred. A cylindrical socket or bore 189 in this knob has a tight force fit down over the slotted end of the shaft, this fit being sufficiently tight so that as the knob is manually forced down over the shaft the two tongue portions 183 and 184 will be sprung towards each other. In this manner, a friction grip can be obtained which will insure that the knob will never become loosened accidentally, but which will still enable the knob to be released manually by the exertion of a substantial manual effort. The upper end of the bore 189 has a stepped offset 192 of the same proportions as the stepped offset in the end of the shaft, the stepped offset in the bore defining a transverse torque transmitting surface 192' which is adapted to match with the transverse torque transmitting surface 182' on the shaft. Thus, these two torque transmitting surfaces are adapted to transmit all rotative forces from the knob to the shaft, which avoids the possibility of these torque forces loosening the friction grip caused by the resiliency of the two tongues 183 and 184.

In the construction shown in Figures 19 to 21 the switch actuating shaft 111 has identically the same slotted end to form the tongues 183 and 184. The manually actuated lever 131 is in the form of a metallic plate or stamping which has a D-shaped opening 194 punched out to receive the end of the longer tongue 183. The flat side 194' of this D-shaped opening functions as a torque transmitting surface for contacting with the torque transmitting surface 182' of the tongue 183. Welded to the under side of the lever is a bushing 195, the bore 196 of which has a tight force fit down over the tongues 183 and 184 in the same relation as the bore 189 of knob 45. If desired, the flanged upper end of the bushing may be provided with a raised rib 197 to facilitate making an accurate weld between the bushing and the lever. In this construction, the D-shaped opening 194 in the lever constitutes the stepped offset in the socket for receiving the stepped offset of the shaft.

Having illustrated and described what we regard to be the preferred embodiments of our invention, we wish to point out that such are merely exemplary and that numerous modifications and rearrangements may be made therein without departing from the essence of the invention.

We claim:

1. In switch apparatus, the combination of a time driven wheel, a toothed wheel disposed substantially concentrically of said time driven wheel, pawl means carried by said time driven wheel adapted to impart intermittent movement to said toothed wheel, tripping means disposable at different points around said time driven wheel for causing actuation of said pawl means at different times, and switch means responsive to intermittent movement of said toothed wheel.

2. In switch apparatus, the combination of a continuously rotating wheel, means for driving said wheel at a timed rate, a normally stationary wheel disposed substantially concentrically of said continuously rotating wheel, pawl means carried by said continuously rotating wheel for imparting movement to said normally stationary wheel, settable means for causing actuation of said pawl means at a predetermined time, and switch means responsive to movement of said normally stationary wheel.

3. In switch apparatus, the combination of a time driven wheel and a toothed wheel concentrically disposed, pawl means carried by said time driven wheel for imparting movement to said toothed wheel, means coacting with said pawl means for causing the latter to operate at a predetermined time, and switch means responsive to movement of said toothed wheel.

4. In a time switch, the combination of a time driven wheel adapted to make one revolution in a twelve hour period, pawl means carried by said time driven wheel, a ratchet wheel concentric of said time driven wheel, means for causing said pawl means to impart movement to said ratchet wheel at a predetermined time in said twelve hour period, and an electric switch responding to said ratchet wheel.

5. In a time switch, the combination of a time driven wheel adapted to make one revolution in a twelve hour period, pawl means carried by said time driven wheel, a ratchet wheel concentric of said time driven wheel, means for causing said pawl means to impart movement to said ratchet wheel at a predetermined time in said twelve hour period, stop means actuated by said ratchet wheel, a multiple stop plate controlled by said stop means, and an electric switch responding to said stop plate.

6. In a time switch, the combination of a time driven wheel adapted to make one revolution in a twelve hour period, pawl means carried by said time driven wheel, a ratchet wheel concentric of said time driven wheel, means for causing said pawl means to impart movement to said ratchet wheel at a predetermined time in said twelve hour period, a stop pin actuated by said ratchet wheel, a pivotally swinging multiple stop plate having an arcuate slot therein, stop shoulders and a cam surface formed in said slot for coacting with said stop pin, spring means for impelling said stop plate in one direction under the control of said stop pin, and electric switch means controlled by said stop plate.

7. In an electric timer for cooking ranges and the like, the combination of a control device for the range, a continuously driven time wheel adapted to rotate at a predetermined timed rate, a driven wheel disposed substantially concentrically of said time wheel, clutching means for effecting brief clutching engagement between said time wheel and said driven wheel for transmitting motion to said driven wheel of limited duration, settable means for causing said clutching means to act at different preselected times, and means responsive to the brief rotation of said driven wheel for governing said control device.

8. In timing apparatus for governing the timed operation of an electric switch, the combination of clock mechanism comprising a clock dial, a continuously driven time wheel adapted to make one revolution in a twelve hour period, a driven wheel associated with said time wheel, clutching means for effecting clutching engagement between said time wheel and said driven wheel for transmitting motion to said driven wheel of limited duration, an adjustable member for causing said clutching means to act at different preselected times, said adjustable member comprising pointer means cooperating with the numerals on said clock dial for indicating the preselected time of operation, and means responsive to motion of said driven wheel for governing said electric switch.

9. In timing apparatus for governing the timed operation of a control device having automatic cyclical movement between on and off positions, the combination of clock mechanism comprising a clock dial, a continuously driven time wheel adapted to have a predetermined degree of rotation in each twelve hour period, a driven wheel disposed substantially concentrically of said time wheel, means responsive to brief rotational motion of said driven wheel for actuating said control device, motion transmitting means carried by said time wheel and operative to transmit brief rotational motion to said driven wheel for each automatic movement of said control device to its on position and to its off position, a first adjustable member for predetermining the time when said motion transmitting means transmits motion to said driven wheel for causing movement of said control device to its on position, a second adjustable member for predetermining the time when said same motion transmitting means transmits motion to said same driven wheel for causing said control device to move to its off position, and pointer means on one of said adjustable members cooperating with the numerals on said clock dial.

10. In timing apparatus for governing the timed operation of a control device, the combination of a continuously rotating time wheel, a driven wheel associated therewith, motion transmitting means carried by said time wheel and operative to transmit brief rotational motion to said driven wheel, settable means for causing said motion transmitting means to act at different preselected times, stop means actuated by said brief rotational motion of said driven wheel, and a spring impelled multiple stop plate controlled by said stop means and governing said control device.

11. In a time switch, the combination of a continuously rotating time wheel adapted to rotate at a preedtermined timed rate, a driven wheel mounted concentrically of said time wheel, motion transmitting pawl means carried by said time wheel and operative to effect brief clutching engagement between said time wheel and said driven wheel for transmitting brief rotational motion of said driven wheel, first and second tripping pins disposable at different points around said time wheel for tripping said motion transmitting pawl means into clutching position, first and second manual adjusting means for adjusting said first and second tripping pins to different positions around said time wheel, a stop pin actuated in one direction by each brief rotational motion of said driven wheel, spring means urging said driven wheel and stop pin in the other direction, a spring impelled stop plate having a plurality of stop shoulders thereon adapted to cooperate with said stop pin whereby motion of said stop pin successively releases said shoulders, and electric switch mechanism responsive to motion of said stop plate.

12. In timing apparatus for securing the timed operation of an electric switch or other control device, the combination of a rotatable control member operatively arranged to govern said electric switch, time responsive mechanism for causing automatic rotation of said control member, said time responsive mechanism comprising a continuously rotating time wheel, a driven wheel, and clutching means for effecting brief clutching engagement between said time wheel and said driven wheel for producing brief rotational motion of said driven wheel, stop means released by the brief rotational motion of said driven wheel for governing automatic rotation of said rotatable control member, manually actuated adjusting means for adjusting the time of said clutching engagement and the time of such automatic rotation, said control member having a set position where it is under the automatic control of said time responsive mechanism and also having a normal position where it is not under said automatic control, and manually operated means for effecting the rotation of said control member from said set position to said normal position and from said normal position to said set position without disturbing the adjustment given said manually actuated adjusting means.

13. In a time switch of the class described, the combination of an electric switch, timing mechanism for controlling said switch, manually settable means for adjusting the time of operation of said timing mechanism, friction brake means for holding said manually settable means in its different settings, control mechanism comprising a control member responsive to said timing mechanism, biasing means tending to move said control member in one direction, friction detent means for holding said control member in a normal position against the action of said biasing means, and a spring serving to exert pressure on said friction brake means and on said friction detent means.

14. In a time switch of the class described, the combination of an electric switch, clock mechanism, automatic actuating mechanism responsive to said clock mechanism for causing automatic operation of said electric switch, manually settable means for adjusting the time of operation of said automatic actuating mechanism comprising an indicator disk having a toothed edge, a shroud gear meshing with said toothed edge to adjust said indicator disk, a shaft mounting said shroud gear, a knob for turning said shaft, a stationary slotted sleeve surrounding said shaft, a friction brake disk slidable along said sleeve but having splined connection with a slot in said sleeve to prevent rotation of said brake disk, and a coil spring surrounding said sleeve and pressing said disk into friction braking engagement with one side of said shroud gear.

15. In a time switch of the class described, the combination of a housing, a clock dial on said housing, clock mechanism within said housing including clock hands cooperating with said clock dial, an electric switch, automatic actuating mechanism within said housing responsive to said clock mechanism for causing automatic operation of said electric switch, manually actuated adjusting means for adjusting the time of such automatic operation, an electric motor unit in said housing for driving said clock mechanism, said electric motor unit comprising an electric motor, a speed reducing gear housing secured to said motor, a power take-off shaft having one end projecting from one side of said gear housing and its other end projecting from the other side of said gear housing, a gear on one end of said shaft operatively connected to drive the hour hand of said clock mechanism, and a gear on the other end of said shaft operatively connected to drive the minute hand of said clock mechanism.

16. In a time switch, the combination of a continuously driven time wheel, a normally stationary driven wheel disposed substantially concentrically of said time wheel, motion transmitting means carried by said time wheel operative to transmit brief rotary motion from said time wheel to said driven wheel, switch means, responsive to said brief rotary motion of said driven wheel for causing said switch means to move between open and closed positions, manually adjustable switch closing means operative to cause actuation of said motion transmitting means at a desired time for transmitting brief rotary motion to said driven wheel for closing said switch and then interrupting said rotary motion of said driven wheel while said switch means remains closed, and manually adjustable switch opening means operative to cause actuation of said same motion transmitting means at a desired time for transmitting brief rotary motion to said same driven wheel for opening said switch and then interrupting said rotary motion of said driven wheel while said switch remains open.

17. In a time switch, the combination of a continuously driven time wheel, a normally stationary driven wheel, motion transmitting means operative to transmit brief rotary motion from said time wheel to said driven wheel, switch means, means responsive to said brief rotary motion of said driven wheel for causing said switch means to move between open and closed positions, manually adjustable switch closing means operative to cause actuation of said motion transmitting means at a desired time for transmitting brief rotary motion to said driven wheel for closing said switch and then interrupting said rotary motion of said driven wheel while said switch remains closed, and manually adjustable switch opening means operative to cause actuation of said motion transmitting means at a desired time for transmitting brief rotary motion to said driven wheel for opening said switch and then interrupting said rotary motion of said driven wheel while said switch remains open.

18. In time control apparatus of the class described, the combination of a continuously driven time wheel, a normally stationary driven wheel, motion transmitting means operative to transmit brief rotary motion from said time wheel to said driven wheel, a control device having automatic cyclical movement between open and closed positions, means responsive to said brief rotary motion of said wheel for causing said control device to move between said open and closed positions, manually adjustable closing means operative to cause actuation of said motion transmitting means at a desired time for transmitting brief rotary motion to said driven wheel for closing said control device and then interrupting said rotary motion of said driven wheel while said control device remains closed, and manually adjustable opening means operative to cause actuation of said motion transmitting means at a desired time for transmitting brief rotary motion to said driven wheel for opening said control device and then interrupting said rotary motion of said driven wheel while said control device remains open.

WILLIAM P. GALLAGHER.
CARL WEBER.

References Cited in the file of this patent

UNITED STATES PATENTS

| Number | Name | Date |
|---|---|---|
| 1,680,975 | Francis | Aug. 14, 1928 |
| 1,748,298 | May | Feb. 25, 1930 |
| 1,951,028 | Lux | Mar. 13, 1934 |
| 2,067,976 | Mueller | Jan. 19, 1937 |
| 2,227,856 | Hansch et al. | Jan. 7, 1941 |
| 2,301,942 | Gallagher | Nov. 17, 1942 |
| 2,302,625 | Gallagher | Nov. 17, 1942 |
| 2,310,527 | Hutt | Feb. 9, 1943 |